United States Patent [19]
Halling

[11] Patent Number: 5,249,814
[45] Date of Patent: Oct. 5, 1993

[54] MULTI-PLY SEALING RINGS AND METHODS FOR MANUFACTURING SAME

[75] Inventor: Horace P. Halling, Laurel, Md.

[73] Assignee: EG&G Pressure Science, Inc., Beltsville, Md.

[21] Appl. No.: 4,660

[22] Filed: Jan. 14, 1993

Related U.S. Application Data

[63] Continuation of Ser. No. 830,334, Jan. 31, 1992, abandoned.

[51] Int. Cl.⁵ ............................ F16J 15/00; B23K 1/20
[52] U.S. Cl. .................................. 277/206 R; 277/205; 277/236; 228/214
[58] Field of Search ....................... 277/206 R, 29, 199, 277/205, 209, 236, 207 A, 213; 228/182, 214; 29/888.3

[56] References Cited

U.S. PATENT DOCUMENTS

| | | | |
|---|---|---|---|
| 2,263,756 | 11/1941 | Bowers | 309/44 |
| 3,012,802 | 12/1961 | Waite | 288/31 |
| 3,272,521 | 9/1966 | McNenny | 277/205 |
| 3,575,432 | 4/1971 | Taylor | 277/206 R |
| 3,595,588 | 7/1971 | Rode | 277/206 R |
| 3,797,836 | 3/1974 | Halling | 277/200 |
| 4,121,843 | 10/1978 | Halling | 277/200 |
| 4,218,067 | 8/1980 | Halling | 277/205 |
| 4,361,335 | 11/1982 | Vinciguerra | 277/204 |
| 4,394,953 | 7/1983 | Sonnweber et al. | |
| 4,457,523 | 7/1984 | Halling et al. | 277/236 |
| 4,477,086 | 10/1984 | Feder et al. | 277/26 |
| 4,681,349 | 7/1987 | Press et al. | 228/214 |
| 4,690,319 | 9/1987 | Smith et al. | 228/182 |
| 4,759,555 | 7/1988 | Halling | 277/206 R |
| 4,813,692 | 3/1989 | Halling et al. | 277/236 |
| 4,854,600 | 8/1989 | Halling et al. | 277/236 |

Primary Examiner—William A. Cuchlinski, Jr.
Assistant Examiner—Daniel G. DePumpo
Attorney, Agent, or Firm—Roylance, Abrams, Berdo & Goodman

[57] ABSTRACT

A multi-ply sealing ring and method of manufacturing same. Two annular members are nested one within the other and then welded together at equi-distant intervals to form a plurality of annular weld zones. The two annular members are then cut along the weld zones to form a plurality of multi-ply cylindrical bands having weld-sealed opposite axial ends. Each cylindrical band is then formed to include a sealing profile.

15 Claims, 6 Drawing Sheets

MULTI-PLY SEALING RINGS AND METHODS FOR MANUFACTURING SAME

This is a continuation of application Ser. No. 07/830,334 filed Jan. 31, 1992 now abandoned.

FIELD OF THE INVENTION

The invention relates to multi-ply fluid-tight sealing rings for confining fluid at high temperatures and pressures and methods for manufacturing same. The individual plies of the sealing rings are welded together at their opposite free ends and then formed to achieve a desired sealing configuration.

BACKGROUND OF THE INVENTION

Resilient, metallic sealing rings have the ability to repeatedly accommodate large variations in length due to thermal expansions and contractions of assemblies by which they are surrounded and with which they are engaged in sealing contact. In the hot sections of an aircraft gas turbine engine, a seal must be created between components that are at variable distances from one another, depending upon the sum of manufacturing tolerances on several components in the assembly and on relative thermal expansion during operation of the engine.

Convolution-type sealing rings are particularly well suited for application described above. Examples include U.S. Pat. Nos. 3,797,836 and 4,121,843 to Halling. Sealing rings described therein have a single-ply construction. Their use is generally limited by the amount of axial deflection to which they can be subjected without being plastically deformed, and by the amount they are caused to relax at high temperatures or prone to metal fatigue. They must also be manufactured in material of sufficient thickness to avoid excessive stresses due to pressure or deterioration due to oxidation.

Thin wall single-ply seals are sometimes necessary to maintain the stress due to deflection at levels low enough to avoid failure of the seal. This is the case where the amount of deflection, due to installation tolerances and cyclic thermal excursions of the cavity walls, is very large. These thin wall seals tend to be weak and exhibit a low resonant frequency, which can result in vibration induced high cycle fatigue and/or fretting wear failures.

Multi-ply seals are generally known, but these have independently acting plies, in which the plies are not joined together by welding, brazing, etc. One example is found in U.S. Pat. No. 3,012,302 to Waite, wherein a sealing ring has three separate elements nested together to form a three-ply structure. The opposite free ends of the three plies are formed to extend axially so that the sealing line passes through the free ends. Since the free ends are not connected to each other, high pressure fluid may enter the interstitial spaces between the plies. This could result in a higher pressure-induced stress in the outer ply. The stress would be doubled, for example, in the case of a two-ply sealing ring.

Examples of multi-ply annular seals are disclosed in U S. Pat. No. 2,263,756 to Bowers, U.S. Pat. No. 3,595,588 to Rode, U.S. Pat. No. 4,361,335 to Vinciguerra, U.S. Pat. No. 4,477,086 to Feder, and U.S. Pat. No. 4,218,067 to Halling. These patents do not show annular plies connected to each other at their free ends.

SUMMARY OF THE INVENTION

Accordingly, a primary object of the present invention is to provide a multi-ply sealing ring having reduced stress resulting from deflection, while maintaining the pressure carrying capability of the seal.

Another object of the present invention is to provide a method of manufacturing a multi-ply sealing ring in which gases generated by decomposition of foreign matter trapped between the plies are vented to avoid pressure build-up between the plies.

Another object of the invention is to provide an improved sealing ring having increased deflection capability to accommodate the larger cyclic thermal expansion movements occurring in modern turbofan engines without loss of resilience or failure through fatigue.

Another object of the present invention is to provide a stronger sealing ring structure, with higher resonant frequencies, than those normally used in thin-wall sealing ring applications.

The foregoing objects are basically attained by providing a sealing ring having first and second annular members of equal length, one nested within the other, each annular member having first and second opposite ends, the first ends of the first and second annular members forming a first circumferential seam, the second ends of the first and second annular members forming a second circumferential seam, the first and second annular members being welded together along the first and second circumferential seams to form first and second continuous annular weld lines disposed respectively on the first and second annular seams, the first and second annular members being formed to include a pair of sealing legs.

In another aspect of the present invention, a method of manufacturing a multi-ply sealing ring includes the steps of nesting a first tube within a second tube, the first and second tubes being coaxial and in intimate surface contact with each other along a cylindrical interface, welding the first and second tubes together at equi-distant intervals, thus forming a plurality of annular weld zones, cutting the first and second tubes circumferentially through each weld zone to form a plurality of cylindrical bands, each having first and second opposite axial ends and first and second circumferentially welded seams disposed at the first and second opposite axial ends, respectively, and forming each cylindrical band to include a pair of sealing legs.

The use of multiple plies has the effect of raising the resonant frequencies for a previous, single-ply thin wall seal to levels that exceed the range of forcing frequencies expected to be encountered. An additional advantage is that because the plies touch each other at the interface, without being physically connected except at the opposite ends, rubbing interaction between the plies creates frictional damping which reduces the amplitude of the vibratory response of the seal. This will reduce both fatigue-inducing stresses and fretting wear movements.

Other objects, advantages and salient features of the invention will become apparent from the following detailed description, which taken in conjunction with the annexed drawings, discloses preferred embodiments of the invention.

BRIEF DESCRIPTION OF THE DRAWINGS

Referring now to the drawings which form a part of this disclosure.

DETAILED DESCRIPTION OF THE INVENTION

Figure 1:
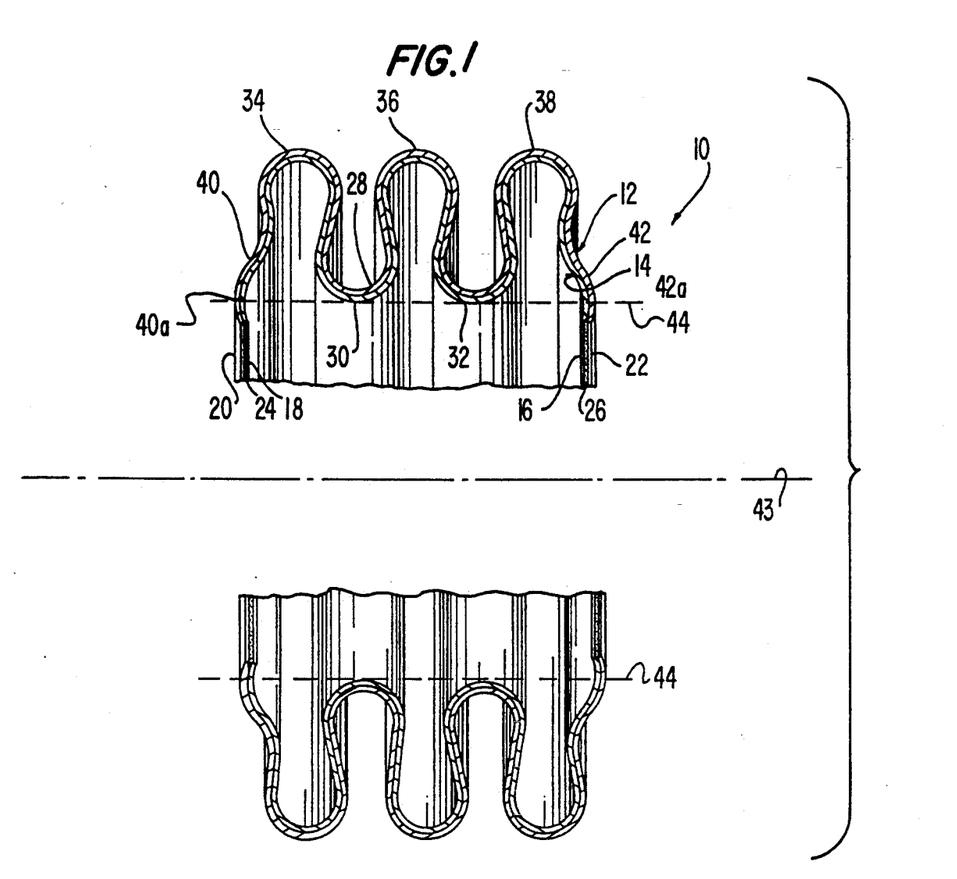
FIG. 1 is a partial radial sectional view showing the details of a preferred embodiment of a sealing ring according to the present invention.

Referring now to FIG. 1, an internally pressurized sealing ring 10 includes two plies or annular members 12 and 14 made of resilient metal. Annular member 12 has opposite axial ends 16 and 18 while annular member 14 has opposite axial ends 20 and 22. The ends 18 and 20 are aligned and welded together by a circumferential weld line 24. Similarly, the ends 16 and 22 are aligned and welded together by a circumferential weld line 26. Weld lines 24 and 26 seal an annular interface 28 where the inner surface of the outer annular member 12 contacts an outer surface of the outer annular member 14. The two annular members welded together at the opposite ends thus form a single cylindrical tube ring having a multi-ply construction. The weld lines 24 and 26 are preferably formed in the aligned ends of the two plies and centered on a circumferential seam disposed at each end between the two plies.

In the embodiment of FIG. 1, the sealing ring 10 is formed to include convolutions 30 and 32, interconnected through bends 34, 36 and 38 to outer legs 40 and 42. Legs 40 and 42 extend generally radially inwardly towards the longitudinal axis 43 of the sealing ring 10. When installed, the outer most portions 40a and 42a of legs 40 and 42 contact opposing faces of an annular cavity and define a sealing line 44. Sealing line 44 is preferably spaced from the weld lines 24 and 26. Although legs 40 and 42 have sinuous formations, they may be straight in cross section with parallel ends, or may otherwise be shaped to include a suitable sealing profile in which a sealing line is defined.

Figure 2:
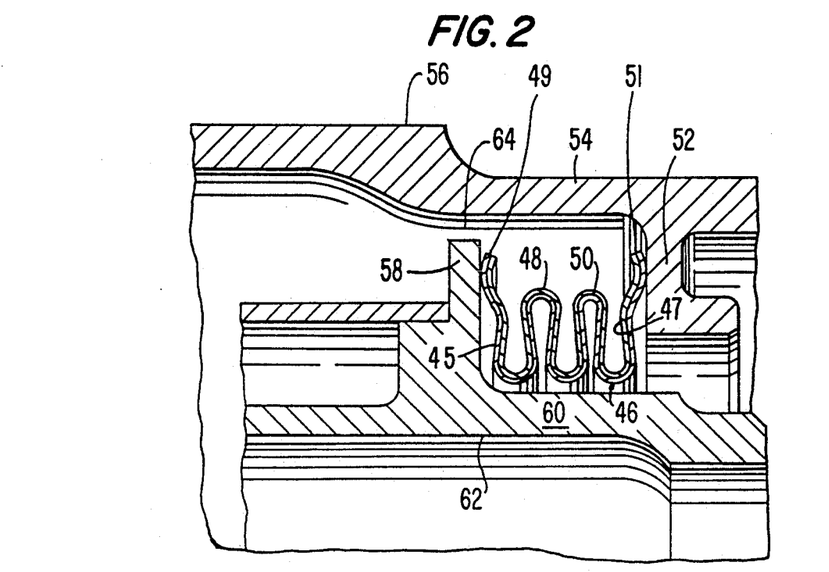
FIG. 2 is a partial radial sectional view taken through an aircraft engine assembly showing an installation in which the sealing ring of this invention has a particular utility.

FIG. 2 shows a typical installation for a sealing ring 46 of the present invention. Sealing ring 46 has a configuration similar to that previously described with respect to FIG. 1, except that it is an externally pressurized type rather than internally pressurized. Thus, convolutions 48 and 50 extend radially outwardly instead of radially inwardly. Two plies 45 and 47 are welded together at the free axial ends to form circumferential weld lines 49 and 51.

The sealing ring 46 is located in a cavity defined by a flange 52 and outer wall 54 of a large conduit pipe 56 and flange 58 and wall 60 of a smaller pipe 62 contained within the larger pipe 56. Fluid pressure is exerted through the channel 64 into the outside portion of the sealing ring 46.

The weld lines 24, 26 and 49, 51 create a seal to prevent the build-up of fluid pressure between the corresponding plies 12, 14 and 45, 47, respectively. The weld lines also facilitate manufacture of the convolutions by rolling or alternative forming processes in that the two plies behave as a single, integrally formed unit. The plies are preferably of the same thickness, but may be made of materials having different characteristics and/or composition. For example, materials may be selected to provide a desired expansion characteristic for a particular sealing ring application. The individual plies may be made of different materials to provide a sealing ring having greater corrosion resistance on one side and more desirable mechanical properties on the other.

While in the preferred embodiment, the two plies 12 and 14 are in intimate surface contact at the interface therebetween, a layer of auto-damping material may be disposed between the two plies. Also, while the illustrated embodiment includes two plies and two convolutions of particular design, additional plies and different shapes may be employed. For each adjacent two plies of a multi-ply structure, an interface will be formed which must be sealed by welding the opposite free ends of the plies. A single weld line may have a width sufficient to span multiple interfaces. However, a series of smaller weld lines could be employed, with each weld line corresponding to each interface. Since the series of weld lines would be closely spaced, they may in fact touch each other and collectively define a single weld line.

Although welding is preferred, the ends may be fusion bonded by other means, such as brazing. The weld lines (or fusion zones) are formed in the axial free ends of the plies and are preferably flush with the ends. The weld zones may consist of fused material from each two adjacent plies. Thus, the term "weld line" used herein is not limited to structure formed by welding, but may encompass structure formed by other bonding techniques.

In a typical jet engine application of a multi-ply sealing ring, such as a pneumatic V-joint for aircraft ducting systems, each ply is 0.005 inches thick. However, there is no limit to either the diameter of the ring or the thickness of the plies. Thickness will be determined by the operating and test pressures and temperatures. The thickness of each ply and number of plies will be determined by the amount of deflection to be experienced in service due to installation tolerances and the thermal excursions of the components and assemblies to be sealed. Moreover, the cross-sectional configuration, including the number of convolutions for convolution-type seals, will also be a determinant of thickness.

A typical single convolution seal, for example, will have an inner diameter of 4.96 inches, an outer diameter of 5.24 inches and two plies, each 0.005 inches thick (±0.001). Typical materials include INCONEL 718, AMS 5589 or 5596.

Figures 3, 4:
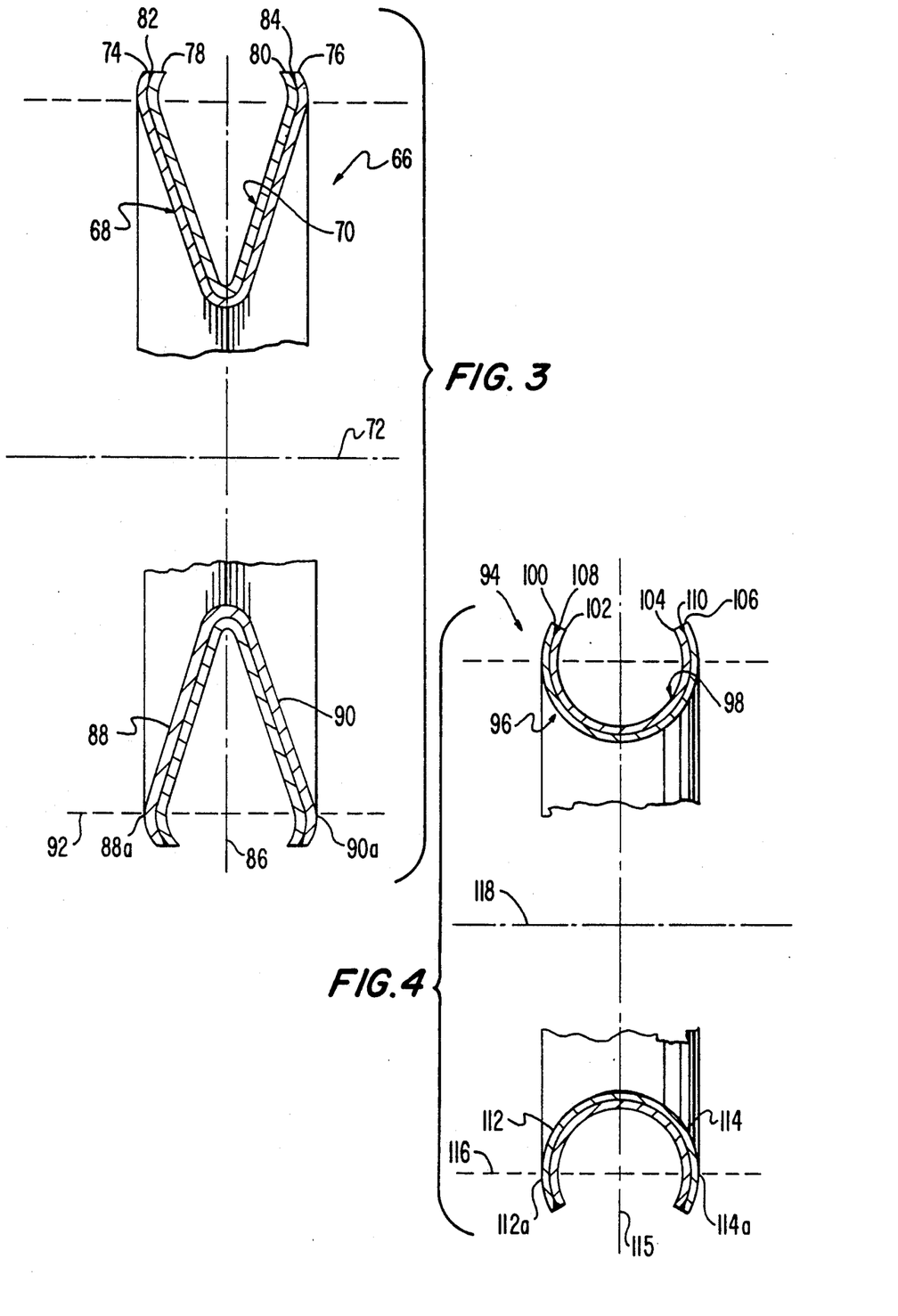
FIG. 3 is a partial radial sectional view showing details of another preferred embodiment of a sealing ring according to the present invention.
FIG. 4 is a partial radial sectional view showing details of another preferred embodiment of a sealing ring according to the present invention.

The Embodiments of FIGS. 3 and 4

Examples of shapes other than the multi-convolution type described above are illustrated in FIGS. 3 and 4. In FIG. 3, a simple V-shaped sealing ring 66 has first and second plies 68 and 70, each made of resilient metallic material. Sealing ring 66 is externally pressurized in that the higher pressure is on the side of ply 70. The V-shaped configuration can be fabricated in an internally pressurized configuration, in which the "V" would open towards the longitudinal axis 72.

Ply 68 has opposite ends 74 and 76, while ply 70 has opposite ends 78 and 80. Ends 74 and 78 are welded together circumferentially along a continuous weld line 82. Ends 76 and 80 are welded together circumferentially by a continuous weld line 84. Weld lines 82 and 84 seal the interface between the two plies 68 and 70 and fixedly connect the two plies together.

The apex of the V-section sealing ring 66 is centered on a radial plane of symmetry 86. The sealing ring 66 is formed to include opposite legs 88 and 90, outer most portions 88a and 90a thereof defining a sealing line 92. The weld lines 82 and 84 are spaced from the sealing line 92, and face radially outwardly, whereas the outer sealing surfaces at the sealing line face axially. Thus, weld deformation does not disrupt the sealing surface of the sealing ring.

In the embodiment of FIG. 4, a C-shaped sealing ring 94 includes first and second plies 96 and 98 welded together at their opposite ends 100, 102 and 104, 106. Circumferential weld lines 108 and 110 seal the interface between the two plies 96 and 98. Sealing ring 94 includes two legs 112 and 114, outer most portions 112a and 114a thereof defining a sealing line 116. Legs 112 and 114 converge at an apex centered on the radial plane of symmetry 115. Sealing ring 94 is an externally pressurized type, with legs 112 and 114 opening away from the longitudinal axis 118. An internally pressurized sealing ring can be fabricated, in which legs 112 and 114 open towards the longitudinal axis 118.

Vented Ply Embodiment

During welding of the ends of the plies, gases may be generated as a result of decomposing foreign materials trapped between the plies. The gases generate pressure between the plies, thus causing their separation and deformation to shapes which do not provide continuous material reinforcement.

Figure 5:
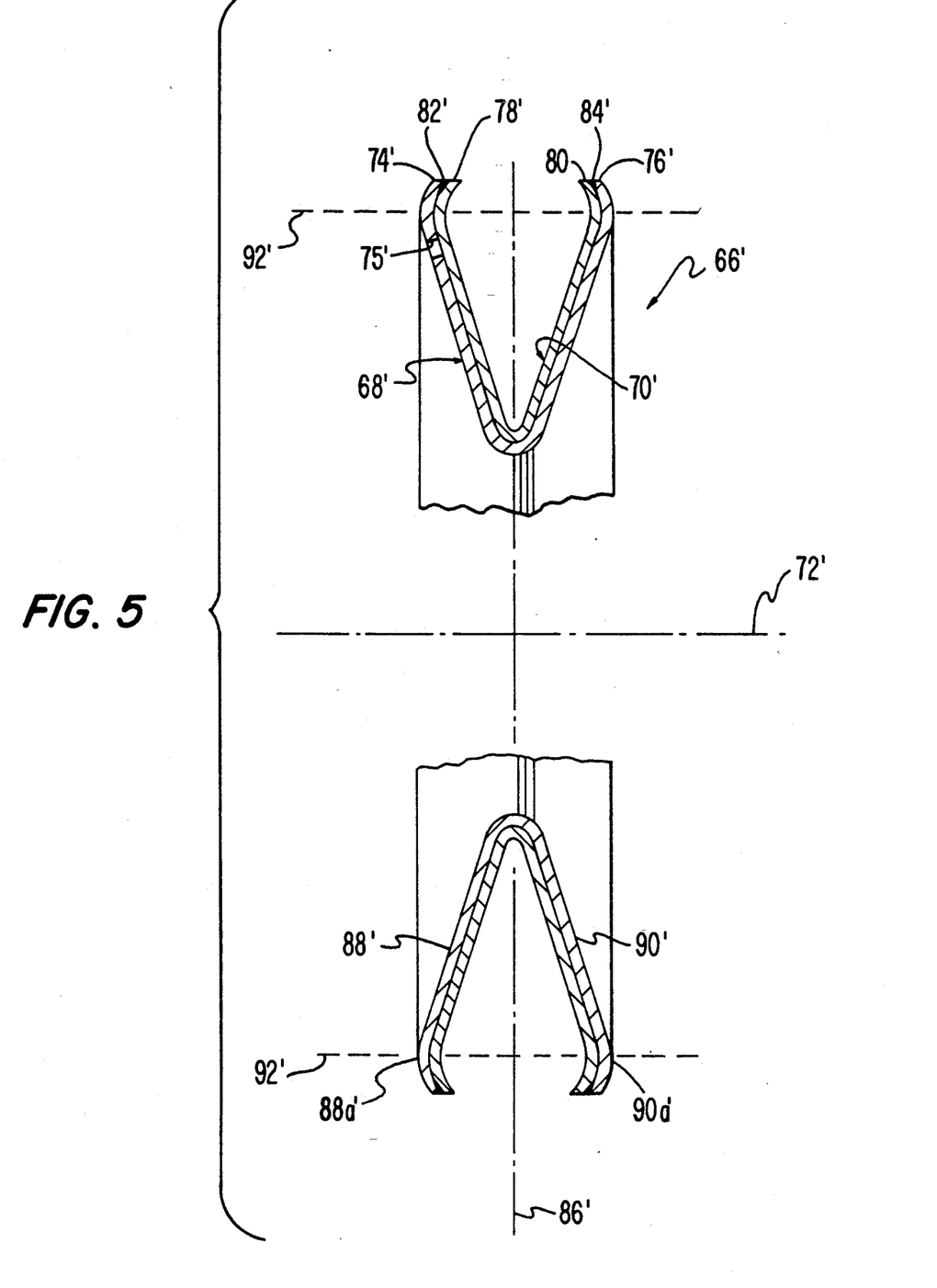
FIG. 5 is a partial radial sectional view showing details of another preferred embodiment of a sealing ring according to the present invention.

Referring to FIG. 5, a sealing ring 66' similar to the FIG. 3 embodiment (having the same features but indicated by primed reference numerals) is provided with at least one vent hole 75' in the ply 68' opposite the high pressure side of the sealing ring, away from the sealing lines 92' and away from highly stressed areas. While only one vent hole 75' is illustrated, others may be provided. Preferably, the vent hole or holes are formed in the ply 68' prior to nesting with ply 70'. The vent hole relieves gas from the interface between the two plies.

Vent holes may be provided according to the present invention for any configuration of multi-ply sealing ring, whether, externally or internally pressurized.

Method of Manufacturing

Figure 6:
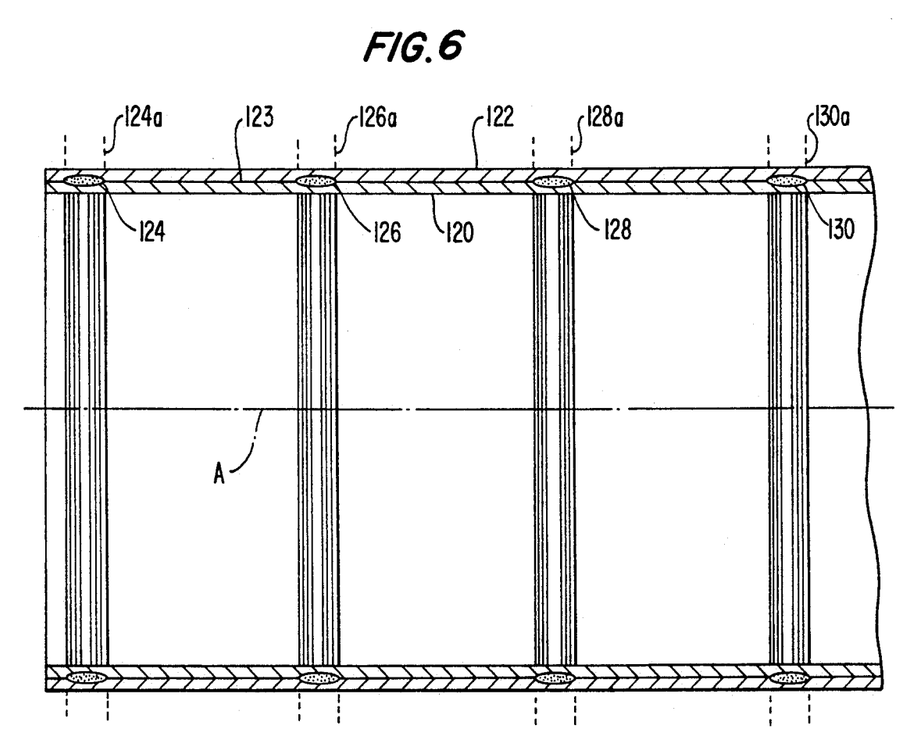
FIG. 6 is a partial, vertical sectional view of two nested and welded tubes, illustrating an intermediate manufacturing stage of the present invention.

FIGS. 6–9 illustrate methods for making a multi-ply sealing ring according to the present invention. An inner tube 120 is nested within an outer tube 122 as shown in FIG. 6. The inner and outer tubes 120 and 122 are thin-walled and relatively long compared to the developed length of the sealing ring cross-section. An inner surface of the outer tube 122 is in intimate surface contact with an outer surface of the inner tube 120 to define a cylindrical interface 123 therebetween. The inner diameter of the outer tube 122 is sized to barely accommodate the outer diameter of the inner tube 120. If necessary, the nested tubes 120 and 122 can be expanded to eliminate any clearance necessary to facilitate nesting. The inner and outer tubes 120 and 122 thus become the individual plies of a multi-ply tubular structure.

The nested tubes 120 and 122 are next welded together at equi-distant intervals to form a plurality of annular weld zones 124, 126, 128, and 130, etc., each of which is perpendicular to the longitudinal axis "A" of the nested tubes 120 and 122. The distance between the centers of adjacent weld zones preferably corresponds to the developed length of the seal cross-section to be formed. The preferred welding technique is electrical-resistance seam welding, which is a fusion-forging process analogous to overlapping spot welding. This welding technique typically involves two counter-rotating disks which leave slight surface impressions (indicated in FIG. 6 as parallel shade lines) on an interior surface of ply 120 and on an exterior surface of ply 122. The weld zones appear as "nuggets" in cross section and generally consist of fusion material between the two plies. Each zone has an axial length 124a, 126a, 128a, and 130a, is tapered at the ends, is centered on the interface 123 and has a width which does not quite extend completely through the sidewall of each tube 120 and 122.

Figure 7:
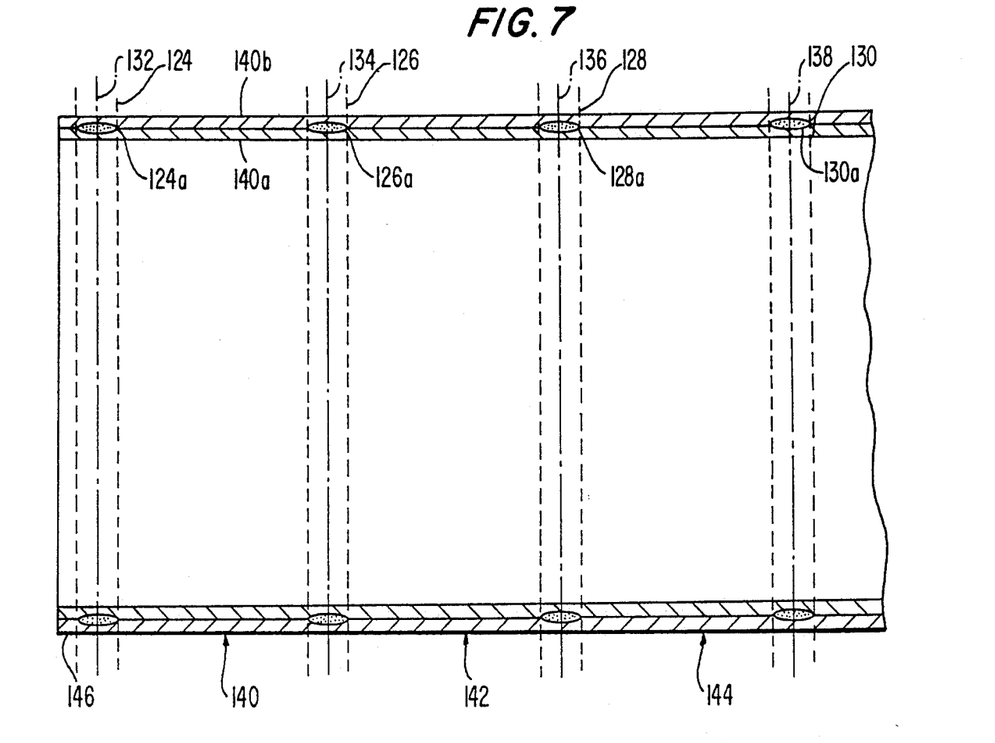
FIG. 7 is a partial vertical sectional view of two welded, nested tubes, after smoothing the weld lines.
Figure 8:
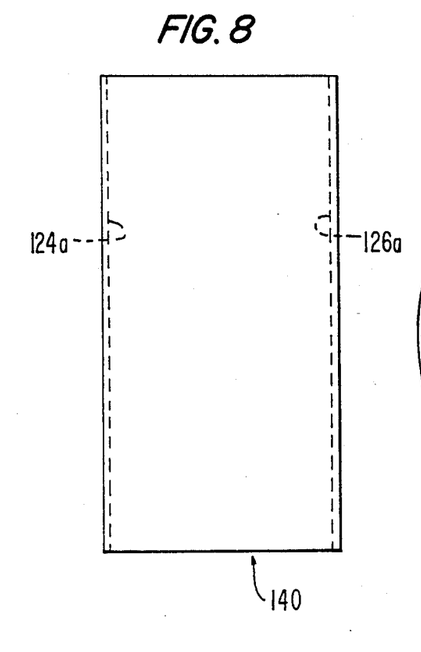
FIG. 8 is a side elevational view of one of the cylindrical bands cut from the welded nested tubes of FIG. 7.
Figure 9:
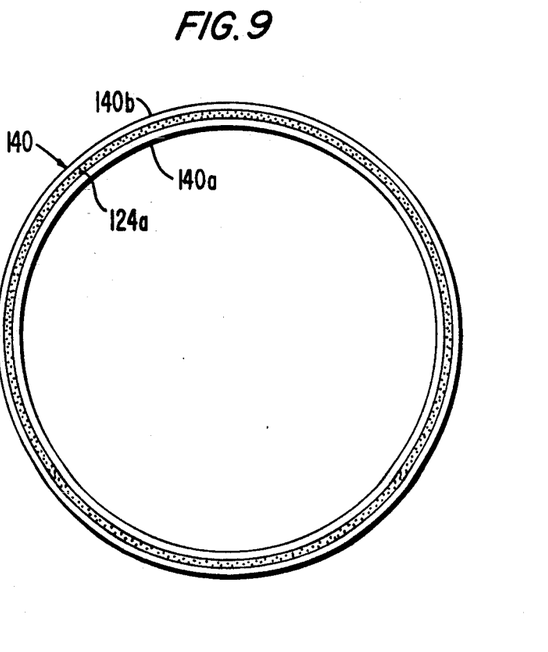
FIG. 9 is an end view of the cylindrical band of FIG. 8.

After welding, the weld zones are cold worked and coined to remove the surface impressions, preferably by bead rolling or planishing. Then, as shown in FIG. 7, the multi-ply welded structure is cut along annular shearing lines 132, 134, 136 and 138, to form a plurality of cylindrical bands 140, 142, 144 and an annular scrap 146. Cylindrical band 140 is illustrated in FIGS. 8 and 9 and includes two plies 140a and 140b welded together at the free axial ends of the plies. The cylindrical bands can be cut from the nested tubes by a precise rotary shearing or die shearing operation. The shearing lines 132, 134, 136 and 138 are centered on the respective weld zones 124, 126, 128 and 130 so that after cutting, the weld zones are divided and shared between adjacent cylindrical bands. Since the first shearing line 132 produces the scrap 146, zone 124 is not shared between two cylindrical bands. As shown in FIG. 9, zone 124 produces a continuous, circumferential weld line, flush with the ends of plies 140a and 140b. Similarly, zone 126 produces a continuous, circumferential weld line, flush with the opposite ends of the plies 140a and 140b. Together, the weld lines formed at opposite ends of the cylindrical band seal the interface between the two plies 140a and 140b.

The cylindrical bands are then de-burred and may also be stress-relieved or solution treated. Then, the bands are subjected to a forming operation, in which a desired sealing ring shape is developed.

Figure 10:
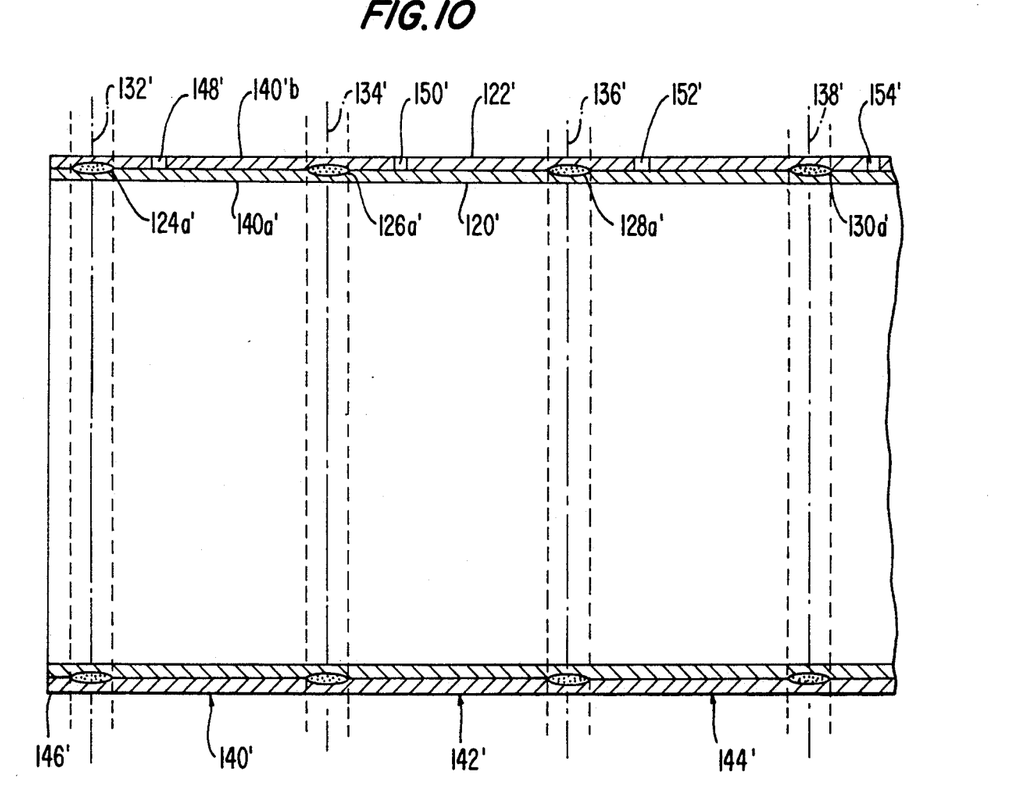
FIG. 10 is a partial radial sectional view of two welded, nested tubes, after smoothing the weld lines and illustrating another embodiment of the invention in which vent holes are formed in one of the two tubes prior to nesting and welding.

FIG. 10 illustrates an alternative method, similar to the previously-described method in that the same structure is referred to by primed reference numerals. The outer ply 122' has vent holes 148' 150', 152' and 154' formed therein prior to nesting. After shearing, each cylindrical band 140', 142' and 144' has a corresponding vent hole which, after subsequent forming into a sealing ring shape, is located away from high stress areas and the sealing line.

While the methods described above involves multi-ply seam-welding of two nested elongated tubes, a number of tubes greater than two may be employed, so long as the free ends of each ply are welded together.

Whether vented or unvented, a multi-ply cylindrical band can be fabricated according to an alternative method of the present invention by nesting two pre-cut tubes having identical lengths corresponding to the developed length of the formed seal ring. The opposite ends of the two tubes are then aligned and edge-welded, preferably by tungsten, inert gas-shielded arc (TIG) welding.

Whether using pre-cut tubes that are edge-welded or elongated tubes that are cut after seam welding, the plies should be welded together prior to forming the seal cross section. Coining the weld area (or reducing the weld area to a constant thickness) by rolling or planishing can occur either subsequent to welding or simultaneously with the forming operation.

The edges may be welded together at an intermediate stage of forming, before the seal is closed to its final configuration, so long as coining is still achievable. However, the preferred method requires welding before forming. Welding first allows the seals to be formed of bands having equal width. Minor tensile and compressive strains are accommodated by the outer and inner plies, respectively, whereas if welding were postponed, different lengths might be necessary to compensate for the difference in the developed lengths of the inner and outer plies when formed to a nested configuration.

Performance evaluations, using finite element analysis (FEA), were conducted to determine stress distributions in the sealing ring cross section of a two-ply structure compared to a single ply structure. Comparison of stresses for a single ply verses two-ply 1.249 inch outer diameter seal reveals that in spite of similarities in stress distribution, the principal stresses in the two-ply structure were only about 50% of those of the single-ply structure for the same conditions.

While various embodiments have been chosen to illustrate the invention, it will be understood by those skilled in the art that various changes and modifications can be made therein without departing from the scope of the invention as defined in the appended claims.

What is claimed is:

1. A sealing ring comprising:
   first and second annular members nested together and being in intimate surface contact at an interface therebetween, each annular member having first and second opposite free ends, the first free ends of the first and second annular members forming a first annular seam, the second free ends of the first and second annular members forming a second annular seam; and
   first and second continuous annular weld lines formed respectively on the first and second annular seams, the first and second annular members being formed to include a sealing profile in which the first and second continuous annular weld lines are located at opposite axial ends of the sealing ring, and are disposed respectively in one of a plurality of radially oriented legs.

2. A sealing ring according to claim 1, wherein one of the first and second annular members is exposed to high pressure and the other of the first and second annular members includes at least one vent hole in communication with the interface between the first and second annular members.

3. A sealing ring according to claim 2, wherein the plurality of legs define a sealing line, the vent hole being positioned away from the sealing line.

4. A sealing ring according to claim 1, wherein the first and second annular members are made from metallic materials having properties different from each other.

5. A sealing ring according to claim 4, wherein the annular member exposed to high pressure is made of a material having greater corrosion resistance than the material of the other annular member.

6. A sealing ring according to claim 1, wherein the first and second continuous annular weld lines are disposed at a position spaced from the sealing line.

7. A sealing ring according to claim 1, wherein the plurality of legs comprise two legs defining a substantially V-shaped sealing profile in which the two legs extend radially outwardly.

8. A sealing ring according to claim 1, wherein the plurality of legs comprise two legs defining a substantially C-shaped sealing profile in which the two legs extend radially outwardly.

9. A sealing ring according to claim 1, wherein the plurality of legs include two outer most legs and define a plurality of convolutions, thus defining a convolution profile in which the two outer-most legs extend radially outwardly.

10. A sealing ring according to claim 1, wherein the plurality of legs comprise two legs defining a substantially V-shaped sealing profile in which the two legs extend radially inwardly.

11. A sealing ring according to claim 1, wherein the plurality of legs comprise two legs defining a substantially C-shaped sealing profile in which the two legs extend radially outwardly.

12. A sealing ring according to claim 1, wherein the plurality of legs include two outer most legs and define a plurality of convolutions, thus defining a convolution profile in which the two outer-most legs extend radially outwardly.

13. A sealing ring comprising:
   a plurality of annular members nested together, adjacent members being in intimate surface contact and defining an interface therebetween, each annular member having first and second, opposite free ends; and
   a plurality of continuous annular weld lines formed respectively on the first and second opposite free ends of the annular members at each interface between adjacent annular members, said plurality of weld lines sealing each interface between adjacent annular members, the plurality of annular members being formed to include a sealing profile having a plurality of radially oriented legs.

14. A sealing ring according to claim 13, wherein one of the annular members is exposed to high pressure and the other members include at least one vent hole in communication with the interface between adjacent members.

15. A sealing ring according to claim 13, wherein the plurality of radially oriented legs define a sealing line.

* * * * *